Sept. 20, 1960 H. RISS ET AL 2,953,297

OPERATING ARRANGEMENT FOR BUSINESS MACHINES

Filed Oct. 13, 1955

8 Sheets-Sheet 1

INVENTORS:
Hans Riss and
Martin Hebel, Jun.
By:
Michael S. Striker
agt.

Sept. 20, 1960 H. RISS ET AL 2,953,297

OPERATING ARRANGEMENT FOR BUSINESS MACHINES

Filed Oct. 13, 1955

8 Sheets-Sheet 2

INVENTORS:

Hans Riss and

Martin Hebel, Jun.

By: Michael S. Striker agt.

Sept. 20, 1960 H. RISS ET AL 2,953,297
OPERATING ARRANGEMENT FOR BUSINESS MACHINES
Filed Oct. 13, 1955
8 Sheets-Sheet 3
FIG. 11
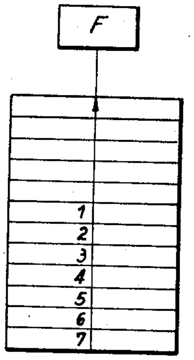
FIG. 9, FIG. 7, FIG. 8
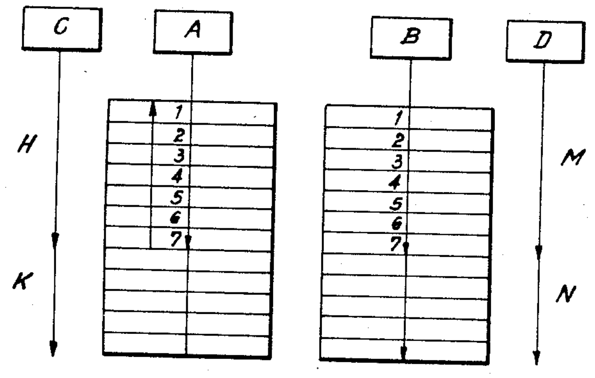
FIG. 12
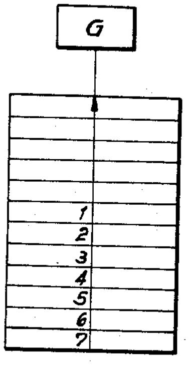
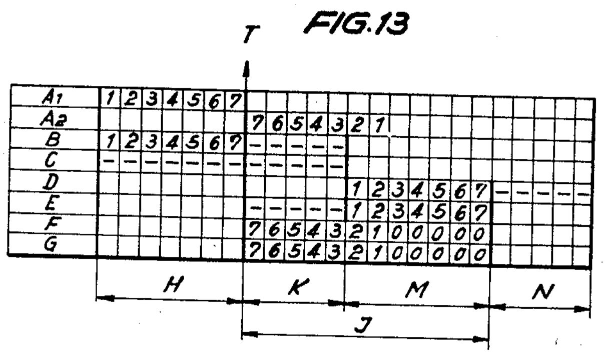
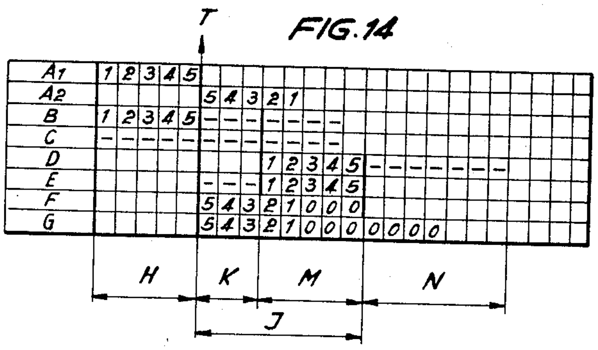
INVENTORS:
Hans Riss and
Martin Hebel, Jun.
By: Michael S. Striker
agt Sept. 20, 1960 H. RISS ET AL 2,953,297

OPERATING ARRANGEMENT FOR BUSINESS MACHINES

Filed Oct. 13, 1955

8 Sheets-Sheet 4

INVENTORS:
Hans Riss and
Martin Hebel, Jun.
By: Michael S. Striker
agt

Sept. 20, 1960 H. RISS ET AL 2,953,297

OPERATING ARRANGEMENT FOR BUSINESS MACHINES

Filed Oct. 13, 1955

8 Sheets-Sheet 5

INVENTORS:
Hans Riss and
Martin Hebel, Jun.
By: Michael S. Striker
agt.

INVENTORS
Hans Riss and
Martin Hebel, Jun.
By: Michael S. Striker
agt

OPERATING ARRANGEMENT FOR BUSINESS MACHINES

Filed Oct. 13, 1955

INVENTORS:
Hans Riss and
Martin Hebel, Jun.
By: Michael S. Striker
agt.

Sept. 20, 1960 H. RISS ET AL 2,953,297
OPERATING ARRANGEMENT FOR BUSINESS MACHINES
Filed Oct. 13, 1955 8 Sheets-Sheet 8

INVENTORS:
Hans Riss and
Martin Hebel, Jun.
By: Michael S. Striker
agt.

United States Patent Office 2,953,297

Patented Sept. 20, 1960

2,953,297

OPERATING ARRANGEMENT FOR BUSINESS MACHINES

Hans Riss, Nurnberg, and Martin Hebel, Hechendorf am Pilsensee, Germany, assignors to Firma Triumph Werke A.G., Nurnberg, Germany, and Firma Eldi-Feinmechanik G.m.b.H., Hechendorf am Pilsensee, Germany Filed Oct. 13, 1955, Ser. No. 540,302

Claims priority, application Germany Oct. 15, 1954

7 Claims. (Cl. 235—59)

The present invention relates to an operating arrangement for business machines, and more particularly to an operating arrangement for a business machine of the type in which computing operations are automatically carried out by partly electrical and partly mechanical means.

In business machines of this type the introduced multi-order numbers are stored in a storing device which has storing elements associated with different denominational orders, such storing elements being consecutively actuated for storing and transferring the digits stored therein.

In storing devices of this type according to the known art, the denominational orders have to be actuated during the input operation and during the printing operation in a sequence starting with the highest denominational order, and during computing operations in a sequence starting from the lowest denominational order.

Due to this fact the input storing means according to the known art include an input storing device and an input printing device into which the orders are introduced starting with the highest denominational order. Transfer from the storing devices to the computer means is carried out in a reversed sequence of denominational orders, and transfer to the printing means is carried out in the sequence in which the orders were introduced.

In the arrangement of the known art, a control cam shaft is provided for consecutively actuating the denominational orders during the input operation, and such control cam shaft must perform a complete revolution before the stored number can be transferred in a reversed order. An operating key is actuated when the input operation is completed for determining the number of orders so that the control cam shaft shifts the carriage during each following step whereby during the following transfer of the highest introduced denominational order, such order is located in proper position in a column of the printed sheet.

In the known arrangement of the input storing device and of the printing storing device, it is necessary to simultaneously move a transfer control cam shaft for the computing device during the movement of the control cam shaft of the input storing device so that the transfer control cam shaft performs as many steps as the control cam shaft corresponding to the reversed order of the denominational orders until it is in a position corresponding to the last stored digit.

During printing, computing operations are carried out in which as many orders have to be actuated as there are storing elements provided in the storing devices. While the printing requires only as many steps as the number to be printed has orders, the computing operation is terminated only after the cam shafts have moved for actuating all storing elements of the storing devices provided for all denominational orders, and consequently the computing operation lags behind the printing operation for a number of steps corresponding to the difference between the number of orders of the introduced multi-order number and the number of storing elements provided in the storing device and respectively associated with the denominational orders.

It is the object of the present invention to overcome the disadvantages of the known art and to provide an operating arrangement for a business machine in which the computing operations are directly started after a multi-order number has been introduced and before the control cam shaft of the input storing device has completed one revolution corresponding to the full capacity of the storing device.

It is a further object of the present invention to provide an operating arrangement for a business machine which operates at a high speed and prevents delays in printing and computing.

It is a further object of the present invention to provide an operating arrangement for a business machine in which the input storing device may be substituted for the printing storing device, and vice versa for printing results in a particularly advantageous and rapid operation.

With these objects in view the present invention mainly consists in a business machine which comprises, in combination, a storing device for storing multi-orders numbers; input means for introducing multi-order numbers into the storing device; input control means controlling the storing device for storing in a selected sequence of denominational orders a multi-order number introduced by the input means into the storing device; output means for transferring multi-order numbers stored in the storing device; transfer control means controlling the output means for transferring in a selected sequence of denominational orders multi-order numbers stored in the storing device; and actuating means actuating the transfer control means directly after the input control means have effected introducing of all denominational orders of a multi-order number into the storing device.

According to a preferred embodiment of the present invention, the business machine includes a first storing device for storing multi-order numbers; a second storing device for storing multi-order numbers; input means for introducing multi-order numbers simultaneously into the first and second storing devices; first and second input control means respectively associated with the first and second storing devices for storing in a selected sequence of denominational orders a multi-order number introduced by the input means into the storing devices; computer means; first output means associated with the first storing device for transferring multi-order numbers stored in the same to the computer means; printing means; second output means associated with the second storing device for transferring multi-order numbers stored in the same to the printing means; first and second transfer control means respectively associated with the first and second output means for transferring the denominational orders of a multi-order number stored in the first and second storing devices, respectively; a first control cam shaft including a set of cams respectively with different denominational orders, each of the cams consecutively actuating during rotation of the first control cam shaft in one direction the first input control members in a selected sequence of denominational orders and consecutively actuating during rotation in opposite direction the first transfer control means in a reversed sequence of denominational orders; a second control cam shaft including a set of cams respectively associated with different denominational orders, each of the cams actuating during rotation of the second control cam shaft in the one direction the second input control means in the selected sequence of denominational orders; first drive means for simultaneously rotating in consecutive steps the first and second control cam shafts in the one direction; second drive means for rotating the first control cam shaft in consecutive steps in the opposite direction; operating means for actuating the second drive means directly after all orders of a multi-order number have been stored in the first and second storing devices so that the multi-order number is transferred to the computer means before the first control cam shaft has completed one revolution; a third control cam shaft including a set of cams respectively associated with different denominational orders, each of the cams actuating during rotation of the third control cam shaft in the one direction the second transfer control means; and third drive means for rotating the third control cam shaft when the second control cam shaft has performed one revolution so that printing starts before the first control cam shaft has completed one revolution in the opposite direction.

In accordance with the present invention means are provided for starting the transfer of stored values directly after the value has been introduced, and the computing operations start before the cams of the cam shaft of the input storing device have operated the storing elements of all denominational orders in the storing devices.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 7 and Fig. 8 are schematic views illustrating the operation of an input storing device and of a printing storing device according to the present invention;

Figure 8A:
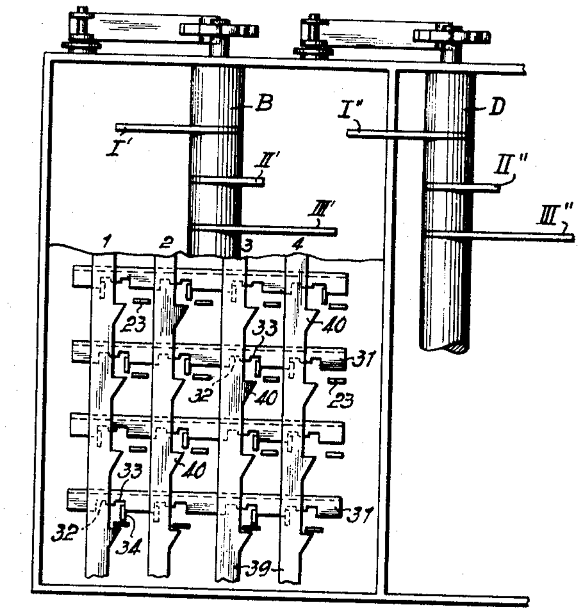
Figure 8B:
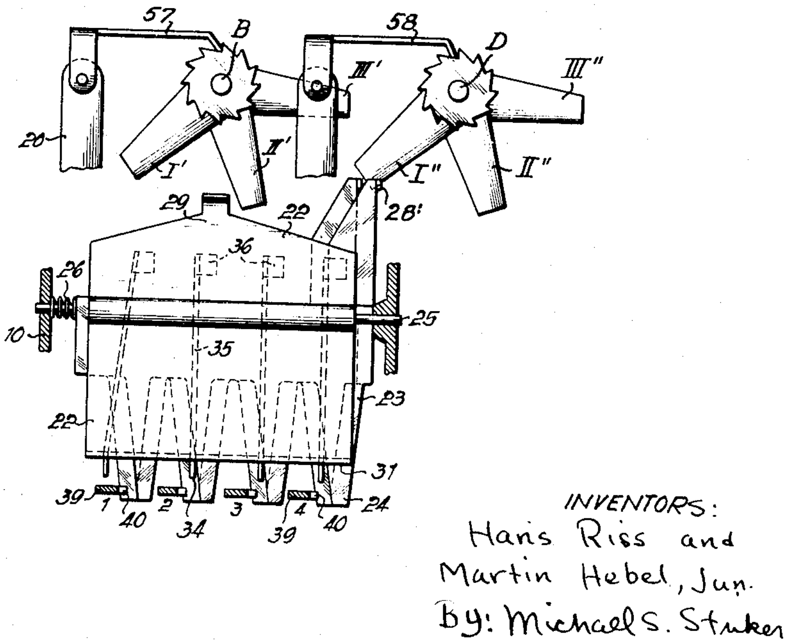
Figure 11A:
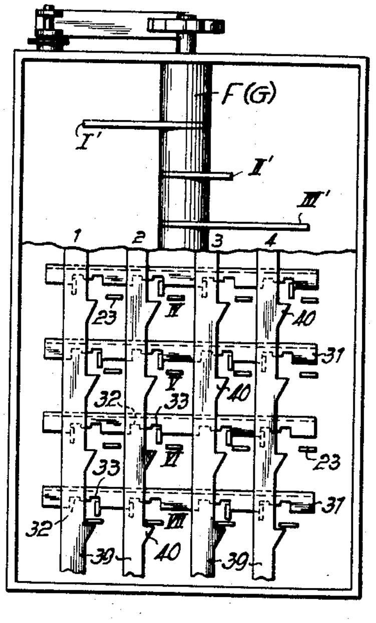
Figure 9A:
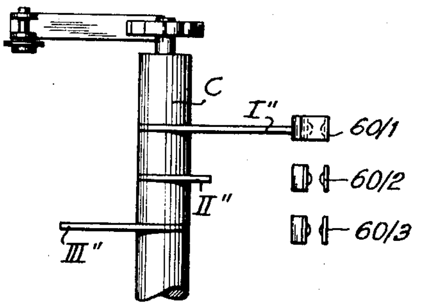
Figures 9B, 11B:
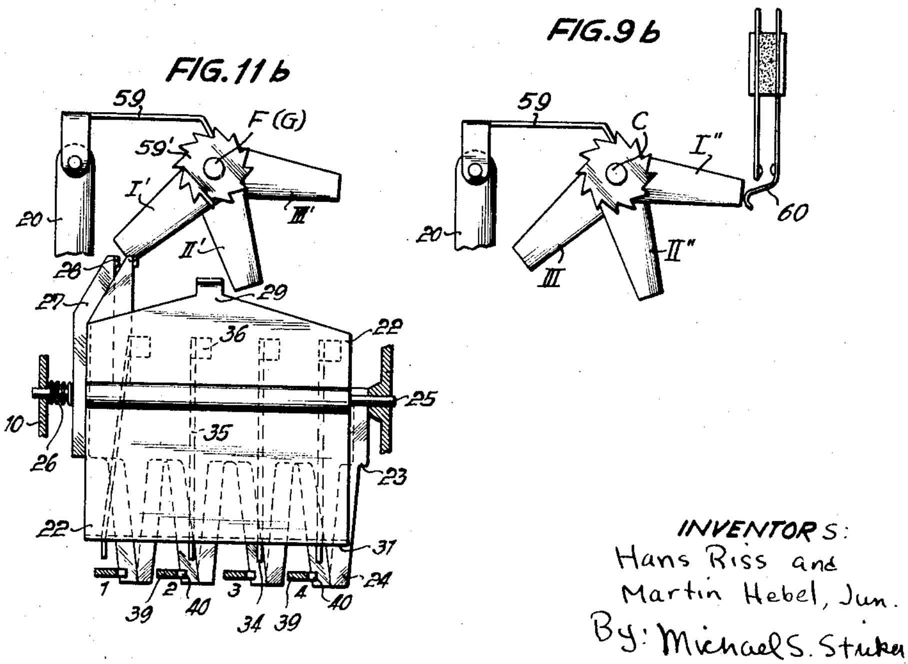
Figure 10:
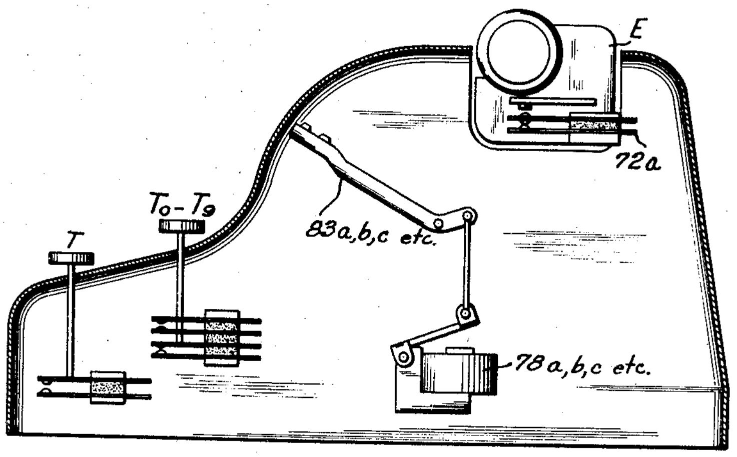
Figure 16:
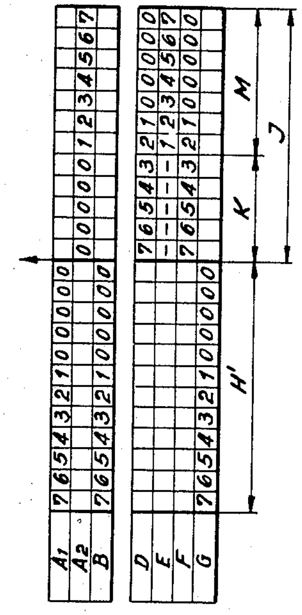
Figure 15:
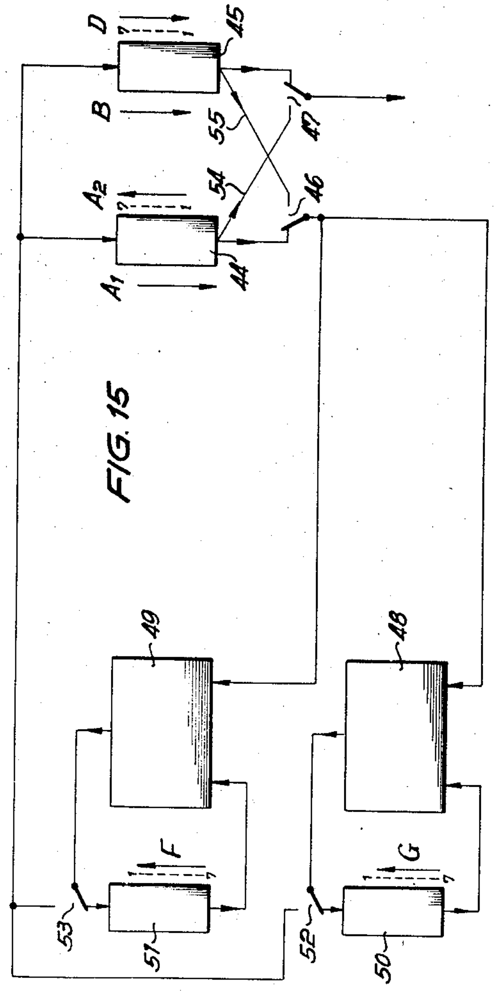
Figure 17:
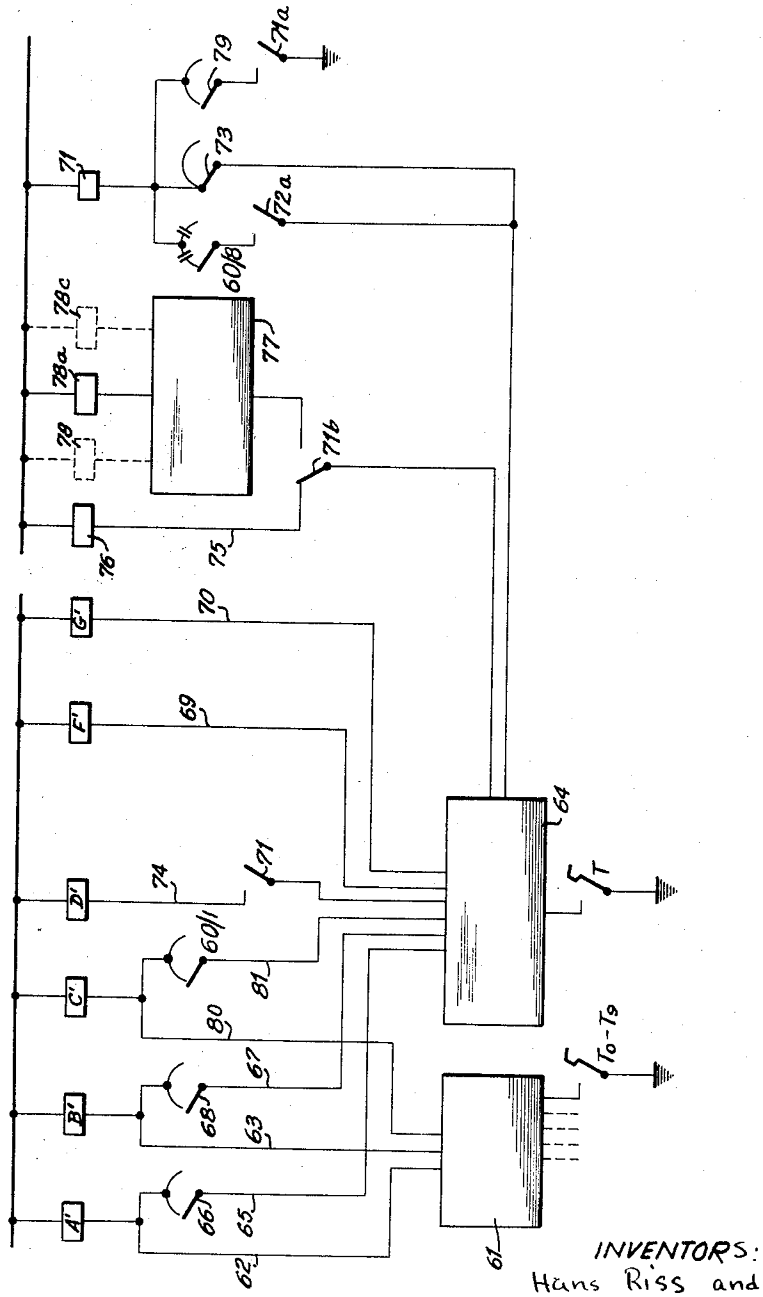

Fig. 8*a* is a fragmentary front view of a printing storing device;

Fig. 8*b* is a fragmentary plan view of a printing storing device;

Fig. 9 is a schematic view illustrating the operation of a counting cam shaft;

Fig. 9*a* is a fragmentary side view of a counting cam shaft;

Fig. 9*b* is a fragmentary plan view of a counting cam shaft;

Fig. 10 is a fragmentary sectional view of a business machine according to the present invention;

Fig. 11 is a schematic view illustrating the operation of a computer storing device according to the present invention;

Fig. 11*a* is a fragmentary front view of a computer storing device;

Fig. 11*b* is a fragmentary plan view of the computer storing device shown in Fig. 11*a*;

Fig. 12 is a schematic view illustrating the operation of another computer storing device;

Fig. 13 is a table illustrating the sequence of the operations of cam shafts provided in the storing devices;

Fig. 14 is a table similar to Fig. 13 illustrating an arrangement in which one of the storing devices has a smaller capacity;

Fig. 15 is a diagrammatic view illustrating an arrangement according to the present invention;

Fig. 16 is a table illustrating the operations carried out by the arrangement shown in Fig. 15; and Fig. 17 is a diagram showing the electrical circuit applied in the arrangement according to the present invention.

In the arrangement of the present invention, the storing devices which are used for storing multi-digit numbers include means for consecutively actuating the parts of the storing device associated with the decimal orders.

Each digit is expressed by digit elements, for instance, if the digit elements 1, 2, 3 and 5 are used, the digit 4 is expressed by the digit elements 1 and 3, and the digit 9 is expressed by the digit elements 1, 3 and 5. Combination elements are associated with each of the digit elements, and are movable between two positions. If the combination elements associated with the digit elements 1 and 3 are shifted, and the other combination elements associated with the digit elements 2 and 5 are not shifted, the combination elements are in relative position which expresses the digit 4.

Storing devices which are used in the arrangement of the present invention are shown in Figs. 1 to 6, in Figs. 8*a* and 8*b*, and in Figs. 11*a* and 11*b*, respectively. The modified constructions shown in these figures, respectively, have certain elements in common which will now be described.

Figure 1:
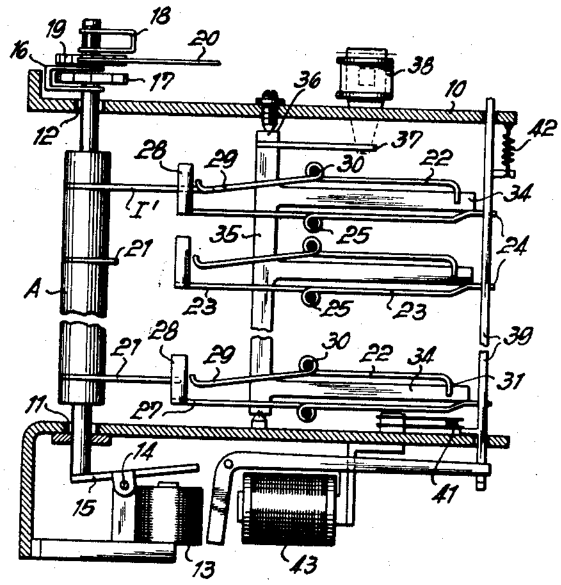
Fig. 1 is a fragmentary side view, partly in section, of an input storing device in a position in which no number is stored therein.
Figure 2:
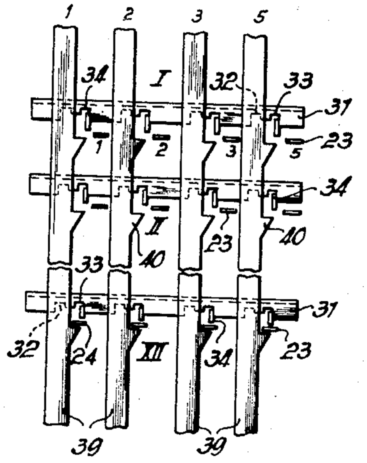
Fig. 2 is a fragmentary front view of the storing device shown in Fig. 1.
Figures 4, 5:
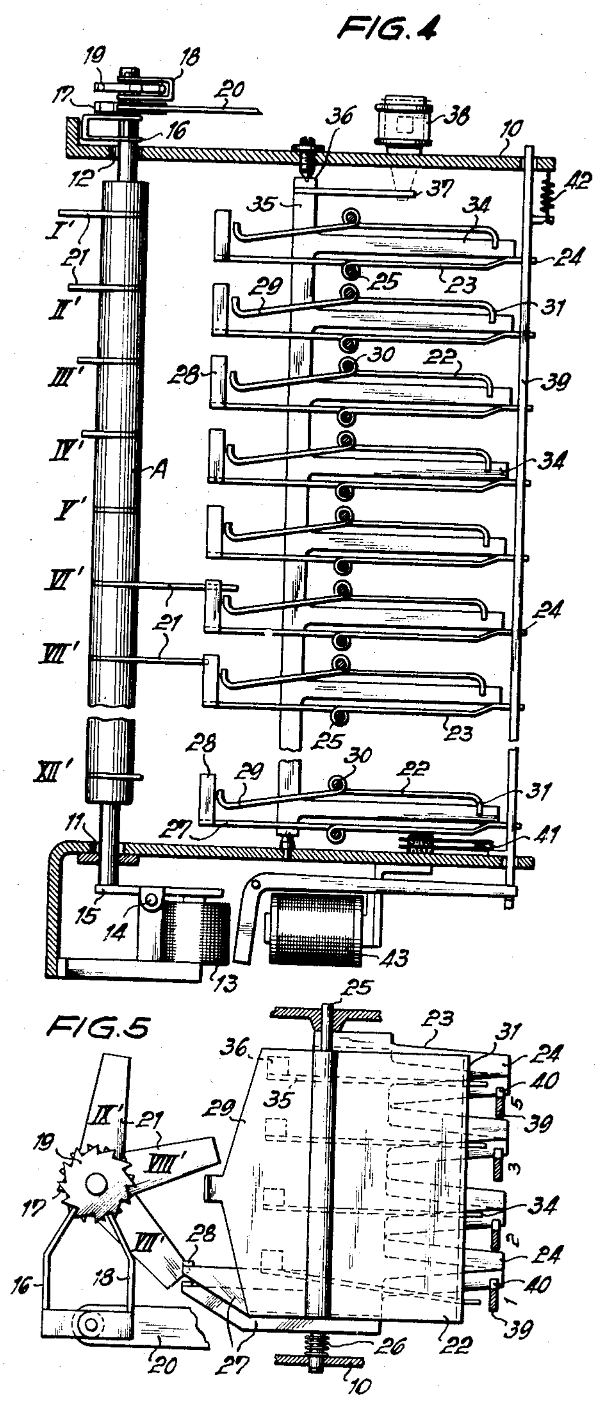
Fig. 4 is a side view, partly in section, of a storing device storing a number.
Fig. 5 is a fragmentary plan view, partly in section, of the storing device shown in Fig. 4.

The storing devices shown in the figures include four resilient storing means 35 which are respectively associated with the digit elements. Each storing means 35 includes a vertical shaft portion 36 which is turnably mounted in the frame 10 by means of pivot pins as best seen in Figs. 1 and 4, and a set of storing members 34 which are respectively associated with the decimal orders. Electromagnetic means 38 are respectively associated with the storing means 35 and have movable armatures engaging arms 37 which are, respectively, connected to the shaft portions 36 of the four storing means 35. When any one of the electromagnetic means 38 is energized by an impulse, the associated storing means 35 is turned from its normal position to an angularly displaced position. In Fig. 2, all storing members 34 are shown in normal position so that no number is stored in the storing device. Any storing member shifted to an angularly displaced position indicates a stored digit element. Four storing members associated with the same order constitute a storing element for storing a digit in the respective order.

Since each storing means 35 is associated with all decimal orders, the respective digit elements are simultaneously introduced into all decimal orders when one of the storing means 35 is turned to its displaced position by the electromagnetic means 38, but when the impulse of the electromagnetic means 38 is terminated, the displaced storing means 35 returns to its normal positions. Therefore it is necessary to lock the storing member 34 of the shifted storing means which is associated with the decimal order in which a digit is to be stored. A set of locking plate means or input control means 22 is provided for this purpose, each locking plate means 22 being associated with one decimal order and with the set of four storing members 34 of the respective decimal order. The locking plate means 22 have downwardly extending flanges 31 provided with four pairs of locking recesses 32 and 33. A storing member 34 in normal position is located opposite a locking recess 33, and in displaced position representing a stored digit element, is located opposite a locking recess 32.

Figure 6:
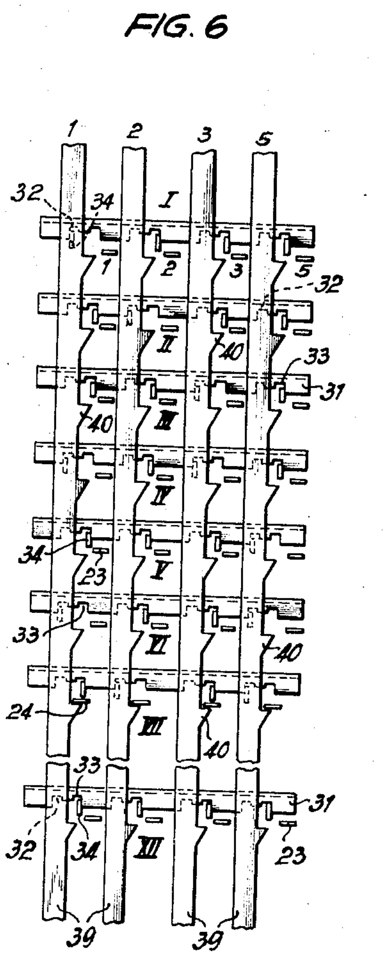
Fig. 6 is a fragmentary front view of the storing device shown in Fig. 4.

Each locking means 22 is pivotable about a horizontal shaft 30 and is provided with an extension 29. When the extension 29 is pressed downwardly, as will be described hereinafter, the locking flange 31 is raised and releases the storing members 34 associated with the same decimal order for movement between normal and displaced positions. When the respective locking means 22 returns to the position shown in Fig. 1, displaced storing members are locked in recesses 32 whereas the other storing members are locked in recesses 33. Figure 6 shows, for example, the storing member associated with the digit element 1 in the uppermost decimal order in displaced position locked in a recess 32. In the next lower decimal order the storing member associated with the digit element 2 is displaced, indicating the storing of the digit 2 in the respective order since none of the other storing members is displaced in the respective order.

A set of four bars 39 is arranged opposite the storing means 35, each bar being associated with one digit element and with one storing means 35.

The operation of the apparatus of the present invention requires that parts of the storing device associated with consecutive decimal orders are consecutively operated. Consequently, bars 39 must be operated to consecutively sense each decimal order.

In each decimal order there is provided a coupling plate means or transfer control member 23 which is shiftable in axial direction on a shaft 25 and also pivotable about the associated shaft 25. Each bar 39 has a set of projections 40 which are located opposite the locking recesses 33. The coupling plate means 23 can be shifted between a position in which the coupling teeth 24 are located opposite the locking recesses 33 as shown in the lowest decimal order XII in Fig. 2, and a position in which the coupling teeth 24 are staggered with respect to the locking recess 33 and to storing members 34 locked in the recesses 33. The latter position is shown for the decimal orders I and II in Fig. 2.

The set of bars 39 is urged upwardly by springs 42. When the common actuating means of bars 39, which is shown to be an electromagnetic means 43, is energized, the bars are held in a lower position. When the electromagnetic means 43 is deenergized, all bars 39 tend to move upwardly. However, the bars whose projections 40 are located opposite shifted coupling teeth 24, as shown in the decimal order XII in Fig. 2, cannot move upwardly if a storing member 34 is located in a recess 33. In the event that one or several of the storing members 34 are located in the locking recesses 32, the respective coupling member 23 pivots about shaft 25 and the respective bar 39 is free to move to a higher position for closing a contact means 41. A closed contact means 41 transfers an impulse to another part of the computer. Bars 39 and contacts 41 constitute output means.

It is necessary to consecutively actuate the input control members 22 in each decimal order of the storing device for storing digits in their respective order, and it is also necessary to respectively actuate the transfer control members 23 in each decimal order in order to transfer the stored digits to other parts of the computer.

Such consecutive actuation is obtained in a different way in the storing devices shown in Figs. 1–6, 8*a* and 8*b*, and 11*a* and 11*b*, respectively.

In the storing device shown in Figs. 11*a* and 11*b*, an actuating control cam shaft F is provided with a set of angularly staggered cams I′, II′, III′, etc. which are respectively associated with the decimal orders. During rotation of the cam shaft F, one of the cams thereon engages the extension 29 of a locking means 22 by an oblique face and depresses the extension 29 so that the locking flange 31 of the respective locking means 22 is raised permitting shifting of the storing members 34. When a cam has passed the respective associated extension 29, the respective locking means drops and locks the associated storing members 34 in normal or angularly displaced positions.

The cams on the cam shaft F also engage the projections 28 on the extensions 27 of the transfer control members 23 during rotation of the cam shaft and shift the same in a timed sequence with the input control members 22 and with the actuation of the bars 39. A spring 26 returns the coupling means 23 to inoperative position when the respective cam has passed beyond the projection 28. The cam shaft F is fixedly connected to a stepping wheel 59′ which is operated by a pawl 59 and driven by a drive member 20 which is operated by electromagnetic means F′ shown in Fig. 17.

The storing device shown in Figs. 8*a* and 8*b* is provided with two actuating control cam shafts B and D which are shifted step by step by ratchet means 57 and 58, respectively, and, as shown in Fig. 17, driven by electromagnetic drive means B′ and D′. The cams I′, II′ etc. of the cam shaft B cooperate with the extensions 29 of the locking means 22 to consecutively raise the locking flanges 31 in each decimal order. The cam shaft D is provided with a set of cams I″, II″, etc. cooperating with projections 28′ on the coupling plate means 23 for shifting the coupling plate means consecutively in each decimal order so that the feeler bars 39 consecutively transfer the digits stored in the respective decimal orders by closing the associated contacts 41, as shown in Fig. 4.

The storing device illustrated in Figs. 1–6 is somewhat similar to the storing device shown in Figs. 11*a* and 11*b*, inasmuch as only one actuating cam shaft A is provided. According to the present invention a cam shaft A is provided with angularly staggered cams 21 which are respectively associated with twelve denominational orders as indicated by the Roman numerals I′ to XII′. Cam shaft A can be shifted in axial direction thereof in two bearings 11 and 12 of the frame 10. In order to permit a shifting of the locking plate means 22 in any one of the two positions of cam shaft A, the projections 28 are elongated in vertical axial direction. Each of the cams 21 is provided with an oblique face cooperating with the extension 29 of the locking plate 22 associated therewith.

Electromagnetic drive means are provided for shifting the cam shaft A and include a winding 13, which, when energized, turns the armature 15 in clockwise direction as shown in Figs. 1 and 4, whereby the cam shaft A is shifted from the lower position shown in Fig. 1 to the raised position shown in Fig. 4.

Two ratchet wheels 17 and 19 are secured to shaft A in axially spaced positions and cooperate, respectively, with ratchet pawls 16 and 18 which are simultaneously driven by a drive member 20 which is actuated by electromagnetic means A′, shown in Fig. 17. The ratchet teeth of the ratchet wheels 17 and 19 face in opposite positions so that operation by ratchet pawl 16 will effect rotation of the shaft A in clockwise direction, and operation by ratchet pawl 18 will effect rotation of shaft A in counterclockwise direction. When the shaft A is lowered the ratchet mechanism 16, 17 is coupled for turning shaft A clockwise, and when shaft A is raised, ratchet mechanism 18, 19 is coupled to rotate shaft A counterclockwise.

As previously described, each cam 21 I′ to XII′ cooperate with an extension 29 of a locking input control member 22 associated with the same decimal order when the shaft A is in its lower position. While a locking means 22 is raised by a cam 21, a digit can be stored in the respective decimal order by selected storing means 35 turned by electromagnetic means 38, whereupon the respective locking means is released by cam 21 and the locking flange 31 locks displaced storing members 34.

After storing of a digit in a decimal order, the respective cam 21 actuates and shifts the associated transfer control member 23 by engaging the projection 28. Thereupon the bars 39 are raised to transfer the combination of digit elements by closing contact 41 to other parts of the machine for computing operations.

Rotation of the lowered cam shaft A in one direction will effect actuation of the decimal orders starting with the highest decimal order and ending with the lowest decimal order for introducing and transferring digits, whereas rotation of the cam shaft A in opposite direction and in raised position will effect actuation of the transfer control members of the decimal orders starting with the lowest decimal order and ending with the highest decimal order for transfer of the digits in reversed order sequence.

Shifting of the cam shaft A between its raised and lowered positions will consequently result in consecutive transfer of the digits in reversed sequences of the decimal orders.

For storing, for example, the number 1,234,567, the cam shaft A is operated in lowered position by the ratchet mechanism 16, 17 to turn in clockwise direction. The cam shaft A is turned seven steps for actuating seven decimal orders. During the first step, the uppermost cam 21 I′ engages and pivots the uppermost locking means 22 while the lowermost cam 21 XII′ releases the lowermost coupling means 23 which is associated with the decimal order XII.

Figure 3:
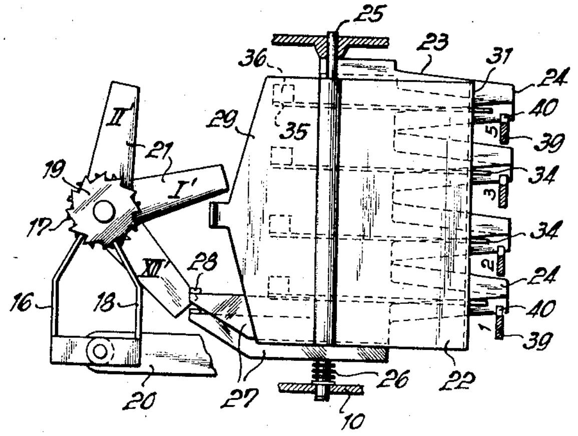
Fig. 3 is a fragmentary plan view, partly in section, of the storing device shown in Fig. 1.

Figs. 4–6 illustrate the storing device shown in Figs. 1–3 in a position storing the number 1,234,567. As clearly shown in Fig. 6, the digit element 1 is stored in the decimal order I since the storing member 34 is in displaced position locked in the locking recess 32. In the decimal order II, the digit element 2 is stored, and the respective storing member 34 is shown to be locked in a locking recess 32 whereas the other storing members of the decimal order II are located in the locking recesses 33. Since the digit elements 1 and 2 also express the digits 1 and 2, only a single storing member is displaced in the decimal orders I and II. In the decimal order VII, the digit 7 is stored which consists of the digit elements 2 and 5, and consequently two storing members 34, respectively associated with the digit elements 2 and 5, are shown in displaced position located in locking recesses 32. Since the decimal order XII is not actuated, all storing members 34 are in normal positions located in locking recesses 33.

As clearly shown in Fig. 6, the transfer controlling coupling means 23 in the decimal order VII is shifted to coupling position so that the coupling members 24 thereof are located opposite the projections 40 of the feeler bars 39. When the set of feeler bars 39 is raised by releasing the armature of the electromagnetic means 43 so that the springs 42 become effective, only the feeler bars associated with the digit elements 2 and 5 can move upwardly to transfer the digit elements 2 and 5 by closing contacts 41. Shifting of the feeler bars associated with the digit elements 2 and 5 is possible since the respective storing members 34 are located laterally displaced with respect to the coupling members 24. The storing members 34, associated with the digit elements 1 and 3, are located in the path of the coupling members 24 and prevent shifting of the feeler bars 39.

The bars 39, and more accurately the electromagnetic means 43, are actuated by the operation of an operating key which will be described hereinafter.

The reversal of the actuation of the decimal orders by shifting the cam shaft A is particularly advantageous, since computing operations require consecutive operations in consecutive decimal orders starting from the lowermost order so that a tens-transfer can be carried out, whereas typing and printing operations require an actuation starting with the highest decimal order since numerals are written from the left to the right.

Referring now to Fig. 15, the computing storing device 44 shown therein is of the type illustrated in Figs. 1–6 and has a shiftable actuating cam shaft, the direction of rotation of which can be reversed. The cam shaft A is schematically indicated in its raised position by the arrow $A_2$, and in its lower position by the arrow $A_1$. The printing storing device 45 is of the type illustrated in Fig. 8*a* and includes two cam shafts B and D which rotate in the same direction as the lowered cam shaft $A_1$ as indicated by arrows B and D. Two relay switches 46 and 47 are provided for connecting the input storing devices 44 and 45 to the computer mechanism and to the printing means as will be described hereinafter. A computer device 49 is associated with the columns of a sheet on which the computed numerals are printed, and a computer device 48 is associated with the lines of the respective sheet. A storing device 50 of the type shown in Figs. 11*a* and 11*b* is associated with the line computer device 48, and a similar storing device 51 is associated with the column computer device 49. Figs. 11*a* and 11*b* show two reference characters F and G designating the cam shafts, since a cam shaft F is part of the storing device 51, and a cam shaft G is part of the storing device 50. Switches 52 and 53 connect the computer mechanism with the input storing devices 44 and 45 for transferring results of the computers 49, 51 and 48, 50 to the storing devices 44 and 45 as will be explained hereinafter.

Referring now to Fig. 17, the blocks A′, B′, D′, F′ and G′ respectively indicate electromagnetic drive means for turning the cam shafts A, B, D, F and G of the storing devices 44, 45, 51 and 50, respectively.

In addition to these cam shafts, a further step counting cam shaft C is provided which is rotated by an electromagnetic drive means C′. The cam shaft C is illustrated in Figs. 9*a* and 9*b* and is provided with a ratchet mechanism 59 for being turned in a stepwise motion. Cam shaft C is provided with a set of cams which actuate switches 60/1, 60/2, and so forth during rotation of cam shaft C. No storing device is actuated by the cam shaft C which only serves for counting the steps of the other cam shafts. Switch 60/1 is a rest contact and the other switches are operating contacts.

Fig. 17 further shows an impulse transmitter 61 which is operated by the number keys $T_0$ to $T_9$ which are also shown in Fig. 10 and is connected by conductors 62, 63 and 80 to the drive means A′, B′ and C′. Another impulse transmitter 64 is operated by the operating key T, also shown in Fig. 10. The impulse transmitter 64 is connected by connections 65, 67, 81, 74, 69, and 70 to the drive means of the cam shafts, the conductors 65, 67 being respectively provided with automatic interrupter switches 66, 68. The switch 60/1 of cam shaft C is arranged in conductor 81 leading to drive means C′. The connection 74 contains a switch 71*c* operated by relay winding 71. The impulse transmitter 64 produces twelve impulses corresponding to the twelve decimal orders for which the storing devices 50 and 51 are designed.

A relay 71 operates three switches 71*a*, 71*b* and 71*c* and is either energized by a cam contact 73 of the cam shaft B or by a cam contact 60/8 of the cam shaft C and a contact 72*a* which is operated by the carriage in a predetermined carriage position relative to a column. The latter actuation is preferred for storage devices having a smaller capacity, for instance only eight decimal orders.

The electromagnetic means 76 is associated with the carriage E, see Fig. 10, for shifting the same in a stepwise motion and is controlled by impulses from the transmitter 64 through switch 71*b* and conductor 74 when key T is operated. The control means 77 is associated with the electromagnetic means 78*a*, 78*b*, 78*c* which operate the printing type levers 83*a*, 83*b*, 83*c*, and so forth.

Referring now to Figs. 7, 8, 9, 11, 12, 13 and 14, which schematically illustrate the operation of the arrangement of the present invention, it will be understood that the arrows indicate the directions of movement of the moving parts, and more particularly of the cam shafts A, B, C, D, F, and G and of the carriage E.

The cam shaft A turns in clockwise direction during the storing of a numeral and stores the number 1,234,567 in the storing device 44 as described with reference to Figs. 4–6. During clockwise turning of shaft A in its lowered position $A_1$, the orders are stored starting with the highest decimal order and ending with the lowest decimal order. This storing operation takes place in the time period H shown in Fig. 13 and is shown in the first line of Fig. 13. After all digits are stored, the operating key means T is actuated whereby the next sequence of operations is started. The cam shaft A is raised from the position $A_1$ to the position $A_2$ by the electromagnetic means 13, 14, 15 shown in Fig. 4, and consequently starts rotation in counterclockwise direction. During such rotation in counterclockwise direction, the transfer control members 23 are consecutively operated starting from the lowest decimal order and ending with the highest decimal order so that the digits stored in the respective orders are transferred in reversed sequence by the feeler bars 39 and the contacts 41. This operation is shown in the second line of Fig. 13.

The shaft B of the printing storing device 45 turns also in clockwise direction during the time period H so that the digits are stored in the printing storing device 45 starting with the highest order. After the seven orders are stored in the printing storing device 45, cam shaft B continues its turning movement in the same direction until it arrives in its initial position after a total of twelve steps. This time period is indicated in Fig. 13 by the character K.

The actuatng cam shaft C turns together with and in the same direction as the cam shaft B. The previously described cam contact 60/8 of shaft C energizes the relay winding 71 through the carriage contact **72*a* as shown in Fig. 17. The relay winding 71 shifts switch 71*b* and effects starting of the printing operation by disconnecting the electromagnetic means 76, which moves the carriage stepwise without printing, and by connecting the printing electromagnetic means 78*a*, 78*b*, 78*c* and so forth which actuate the type levers 83 to the impulse transmitter 64**.

The shaft F of the computer storing device 51 which is associated with the columns of the printed sheet for totalizing column entries, starts its rotation when the operating key T is operated since the impulse transmitter 64 is connected by the operating key T to the drive means F′ of shaft F, as shown in Fig. 17. Consequently, the introduced numerical value is simultaneously stored in the storing device 51, see Fig. 11 and line 7 of Fig. 13.

The shaft G of the computer storing device 50, which is associated with the lines of the printed sheet for totalizing line entries, also starts its rotation when the operating key T is operated since the impulse transmitter 64 is connected by the conductor 70 to the drive means G′ of shaft G, as shown in Fig. 17. Consequently, the numerical value is simultaneously stored in the storing device 50 during the time period H, see Fig. 12 and line 8 of Fig. 13. It will be noted that shafts F and G rotate in the same direction as shaft A in the raised position 18 so that the decimal orders are stored starting from the lowest decimal order as is desirable for computing purposes.

The capacity of the storing device 50 can be made smaller than the capacity of the storing device 51 since the line storing device 50 stores numerical results having a smaller number of decimal orders than the numerical results stored in the column storing device 51.

At the end of the time period K, the counting shaft C and the shaft B have completed one revolution and are again in initial positions. During the following time period M, printing is carried out under control of the printing storing device 45. The digit values stores therein are transferred by the shaft D of the storing device 45 starting with the highest decimal order as desired for printing. This operation is shown in line 5 of Fig. 13.

The start of the turning movement of cam shaft D is obtained by a contact 73 operated by a cam of the shaft B. In the event that a storing device of smaller capacity is provided, the cam contact 60/8 and the switch **72*a*, which is operated by the carriage, effect energizing of relay 71 so that the switch 71*c* connects through the conductor 74 the drive means D′ with the transmitter 64** whereby rotation of the cam shaft D is started.

During the period K, the carriage E has moved five spacing steps without actuation of the printing means. During the time period M, the carriage E continues its stepwise movement while the printing is being carried out under control of shaft D and storing device 45. The switch **71*b* disconnects the electromagnetic means 76 which moves the carriage in spacing steps when the relay 71 is energized by cam contact 60/8 of the cam shaft C. Simultaneously, the electromagnetic means 78 which are associated with the type levers 83 are energized so that printing is carried out. The relay 71 is maintained in energized condition by a cam contact actuated by the shaft D and by the automatically holding switch 71*a*** until the shaft D has returned to its initial position.

The operation of the arrangement will now be described with particular reference to Fig. 13. Assuming the carriage E to be positioned at the beginning of a column, the following operations are carried out for making an entry 1,234,567 in the respective column:

(1) The number 1,234,567 is simultaneously stored in the input storing device 44 and in the input printing storing device 45. During this operation, the lowered cam shaft A in position $A_1$ and the cam shaft B turn in clockwise direction so that the digits are stored in the respective seven decimal orders starting with the highest decimal order. The digits 1 to 7 are introduced by operation of the keys $T_0$ to $T_9$ which actuate the impulse transmitter 61.

(2) The operating means T is operated for starting the automatic computing and printing operations. The electromagnetic means 13 is energized and the cam shaft A is raised to the position $A_2$ so that cam shaft A rotates in counterclockwise direction and consecutively actuates the coupling means of the input storing device 44 in reversed sequence. At the same time computing operations are carried out since the shafts F and G of the computer storing devices 50 and 51 start turning. The digits stored in the input storing device 44 are transferred to the computer devices 49 and 48 by contacts 41 closed by bars 29 and through the switch 46 as shown in Fig. 15. Since the shafts F and G of the computer storing devices 51 and 50 are simultaneously rotated, the computer devices 49 and 48 simultaneously receive values stored in the computer storing devices 51 and 50.

(3) When the operating key T is actuated, the carriage E starts its stepwise movement and moves without printing until the shafts B and C have returned to initial positions. This is necessary in order to obtain the printing of the highest decimal order in proper position in the column. The time required for the cam shafts B and C to return to initial positions after storing the selected number of decimal orders, is indicated by the reference character K in Fig. 13.

(4) Directly after the cam shafts B and C have arrived in initial positions, the printing starts under control of cam shaft D. When printing is completed after the time period M, the computing operations are terminated after the time period J. During the time period M, the cam shaft D transfers the digit values from the printing storing device 45 to the printing means 78 and 83 starting with the highest decimal order and ending with the lowest decimal order as desired for printing. The unit order, for instance the digit 7, is printed when the last order has been actuated in the column and line computing devices 48 and 49. Since the computed number has only seven orders, the last computed value is 0.

(5) After the last digit is printed, the input computer storing device 44 and the input printing storing device 45 are ready for the next storing operation. However, the shaft D must perform five further steps in order to return to its initial position since shaft D is movable between twelve positions and the printed number has only seven orders. The time period N required for return of cam shaft D to initial position may be used for a tabulating operation, or for storing a new value in the input storing device 44.

Fig. 14 illustrates the operation of a smaller storing device similar to the showing of Fig. 13. Such smaller storing device, which will be referred to hereinafter as "split storing device" has, for instance, only the capacity of storing eight decimal orders. In the operations shown in Fig. 14, a number having five orders is introduced, stored and printed. The shaft A performs only five steps in lowered position $A_1$ and in raised position $A_2$. The shaft B also performs five steps for storing five orders, and then returns to initial position. The shaft C starts after eight steps together with relay 71 rotation of shaft D of the printing storing device. At this time, the carriage E has made three steps without printing, and thereupon performs five steps for printing the number 12,345. The shafts F and G correspond to the operations described with reference to Fig. 13. It is to be considered that the shaft F is designed for a storing device capable of storing eight decimal orders, whereas the shaft G is designed for a storing device capable of storing twelve decimal orders so that the shaft F performs only eight steps and the shaft G performs only twelve steps.

After the computing operation has been terminated in the column computer device 49 during the time period J, the shaft G of the line computer device has a lag of twelve minus eight steps that are four steps relative to the shaft F. These four steps and the return of the shaft D to initial position during the time period N already start at a time at which the input storing device 44 and the printing storing device 45 are ready for the next input operation so that no time is lost since the shafts F and G return during the next storing operation to initial positions.

The arrangement shown in Fig. 15 is used for transferring a result from a line storing device 50 for the purpose of carrying out an addition, and of storing in the column storing device 51, or for printing a result. These operations are indicated in Fig. 16. The input means of the two storing devices 44 and 45 are connected to the upper contacts of the operating switch as 52, 53 whereas the output of the input storing device 44 is connected through the switch 46 to the column computing means 49 and 51 and to the line computing means 48 and 50.

The output means of the printing storing device 45 are connected through switch 47 with the electromagnetic means 78 which operate the type levers 83.

The switches 46, 47, 52 and 53 are provided in the arrangement shown in Fig. 15 for transferring values stored in the computer storing devices 50 and 51 through the associated computers 48 and 49 into the storing devices 44, 45. The arrows shown in the connections between the storing devices and the computer means indicate an input operation when arranged above the storing devices 44, 45, 50 and 51 and indicate an output transfer operation if shown below these storing devices in Fig. 15.

The two storing devices 44 and 45 are connected by a reversing connection 54, 55 to the operating contacts of the switches 46 and 47 so that the printing storing device 45 is connected to the computer means when the switch 46 is shifted out of the illustrated position to its other position.

The arrow $A_1$ indicates the shaft A in lowered position for storing. The shaft $A_1$ stores a number starting with the lowest decimal order, that is the digit 7, and ends with the highest decimal order and the digit 1. The order of storing is reversed as compared with the input storing operation explained with reference to Fig. 13.

The shaft A in raised position $A_2$ turns counterclockwise and actuates the highest decimal order first as shown in Fig. 16. During a normal computing operation, shaft A in position $A_2$ is used for computing while the switch 46 is in its normal position shown in Fig. 15. For transferring the results and for result printing, the switch 47 is shifted from the position shown in Fig. 15 to its operative position, and the switch 46 is shifted from the position shown in Fig. 15 to the right in Fig. 15 to its operative position.

The shaft B is the first shaft of the printing storing device and actuates the storing device 45 starting with the lowest decimal order, as shown in Fig. 16, corresponding to the position of shaft A in position $A_1$. The switch 46 is shifted to the right to its operative position and the switch 47 is shifted to the left to its operative position.

The second shaft D of the printing storing device 45 actuates the storing device 45 starting with the lowest decimal order as shown in Fig. 16 for transferring the value, and is used for computing operations while the switches 46 and 47 are shifted to their operative positions. The fifth line of Fig. 16 shows the operation of the carriage E, the sixth and seventh lines show the operations of the shafts F and G of the computer storing devices 51 and 50, respectively. The time period H' is the time required for the result transfer operation, the time period J is the time required for computing, such as adding, and the time period M is the time required for printing the results.

The switches 46, 47 are controlled by a relay similar to the contact 72*a* in Fig. 10, which is controlled by the carriage E. The switches 52 and 53 are operated by a contact actuated by the carriage in accordance with the column position of the carriage, or a key is provided for manual operation of the switches 52, 53.

Due to the switch arrangement of Fig. 15, it is possible to substitute the two storing device 44, 45 for each other, which is done by operation of the switches 46, 47 when numbers are received by the input storing device from the column and line computer means 48, 49, 50, 51 in the order sequence desired for computing operations, that is starting with the lowest decimal order, whereupon the number is printed by means of the reversed shaft of the input storing device 44 in the reversed sequence of decimal orders.

At the same time the shaft D of the printing storing device 45 stores the number through the switch 46 in operative position for further computing operations. The operation of the switches 46, 47 consequently obtains a reversing of the functions of the two storing devices 44, and 45.

It will be understood that each of the elements described above, or two or more together, may also find a useful application in other types of business machines differing from the types described above.

While the invention has been illustrated and described as embodied in an operating arrangement for a business machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a business machine, in combination, a printing storing device having denominational sets of storing members for storing multi-order numbers; input control means having a denominational set of input control members normally locking the corresponding sets of storing members for storing in said sets of storing members of said printing storing device a multi-order number; printing means; transfer control means providing a coupling with said printing storing device and having a set of transfer control members cooperating with said storing members and operatively connected to said printing means for transferring the orders of a multi-order number stored in said storing members of said printing storing device to said printing means; rotary actuating means stepwise turnable between a plurality of positions and having a denominational set of actuating members respectively operatively connected to said input control members and to said transfer control members for consecutively actuating said input control members and said transfer control members in a selected sequence of denominational orders; a carriage movable in a stepwise movement; spacing means for moving said carriage in steps; and means for actuating said spacing means operatively connected to and controlled by said actuating means in such a manner that said spacing means moves said carriage the same number of steps as said actuating means performs to complete one revolution after actuating said input control members and transfer control members for storing all orders of the multi-order number in said printing storing device.

2. In a business machine, in combination, a printing storing device having denominational sets of storing members for storing multi-order numbers; input control means having a denominational set of input control members having cam followers and normally locking the corresponding sets of storing members for storing in said sets of storing members of said printing storing device a multi-order number; printing means; transfer control means providing a coupling with said printing storing device and having a set of transfer control members having cam followers and cooperating with said storing members and operatively connected to said printing means for transferring the orders of a multi-order number stored in said storing members of said printing storing device to said printing means; rotary actuating cam shaft means stepwise turnable between a plurality of positions and having a denominational set of actuating cam members respectively operatively connected to said cam followers of said input control members and to said cam followers of said transfer control members for consecutively actuating said input control members and said transfer control members in a selected sequence of denominational orders; a carriage movable in a stepwise movement; spacing means for moving said carriage in steps; and means for actuating said spacing means operatively connected to and controlled by said actuating means in such a manner that said spacing means moves said carriage the same number of steps as said actuating means performs to complete one revolution after actuating said input control members and transfer control members for storing all orders of the multi-order number in said printing storing device.

3. In a business machine, in combination, a first computer storing device having denominational sets of storing members for storing multi-order numbers; a second printing storing device having denominational sets of storing members for storing multi-order numbers; first and second input control means respectively associated with said first and second storing devices and having, respectively, a denominational set of first input control members and a denominational set of second input control members normally locking the corresponding sets of storing members; computer means; printing means; first and second transfer control means respectively providing a coupling wtih said first and second storing devices for transferring from said storing members of the same the denominational orders of a multi-order number stored in said first and second storing devices to said computer means and printing means; a first control cam shaft shiftable in axial direction between two shifted positions and including a set of first cams respectively associated with different denominational orders; two sets of first cam followers operatively connected to said first input control members and to said first transfer control members, respectively, said sets of cam followers respectively cooperating with said first cams in said shifted positions of said first control cam shaft; means for shifting said first control cam shaft in opposite directions so that each of said cams consecutively actuates said first input control members in a selected sequence of denominational orders during rotation of said first control cam shaft in one shifted position and in one direction of rotation and so that each of said cams consecutively actuates said first transfer control members in a reversed sequence of denominational orders during rotation in the opposite direction in the other shifted position of said first control cam shaft; a second control cam shaft including a set of second cams associated with different denominational orders; a set of second cam followers respectively cooperating with said second cams and being operatively connected to said second input control members so that during rotation of said second control cam shaft in said one direction said second input control members are actuated in said selected sequence of denominational orders; first drive means for simultaneously rotating in consecutive steps said first and second control cam shafts in said one direction; second drive means for rotating said first control cam shaft in consecutive steps in said opposite direction; operating means for actuating said second drive means after all orders of a multi-order number have been stored in said first and second storing devices so that the multi-order number is transferred to said computer means before said first control cam shaft has completed one revolution; a third control cam shaft including a set of third cams respectively associated with different denominational orders; a set of third cam followers respectively cooperating with said third cams and being operatively connected to said transfer control members to consecutively actuate the same during rotation of said second control cam shaft in said one direction; third drive means for rotating said third control cam shaft when said second cam shaft has performed one revolution so that printing starts before said first control cam shaft has completed one revolution in said opposite direction; a carriage movable in a stepwise movement; spacing means for moving said carriage in steps; and means for actuating said spacing means connected to and controlled by second control shaft in such a manner that said spacing means moves said carriage the same number of steps as second control cam shaft performs to complete one revolution after storing all orders of the multi-order number and after said operating means has actuated said second and third drive means.

4. A business machine as claimed in claim 3 and including a step-counting cam shaft having a set of cams respectively associated with different denominational orders the number of said cams of said step-counting cam shaft being the same as the number of cams of said second control cam shaft; a set of contacts respectively associated with said cams of said step-counting cam shaft, said step-counting cam shaft rotating simultaneously with said second control cam shaft; said means for actuating said spacing means being connected to and controlled by said step-counting cam shaft in such manner that said spacing means moves said carriage the same number of steps as said step-counting cam shaft performs to complete one revolution after said operating means has actuated said second and third drive means.

5. In a business machine, in combination, a first computer storing device having denominational sets of storing members for storing multi-order numbers; a second printing storing device having denominational sets of storing members for storing multi-order numbers; first and second input control means respectively associated with said first and second storing devices and having, respectively, a denominational set of first input control members and a denominational set of second input control members normally locking the corresponding sets of storing members;

computer means including at least computer storing device having a denominational set of storing members for storing a multi-order number; printing means; first and second transfer control means respectively providing a coupling with said first and second storing devices for transferring from said storing members of the same the denominational orders of a multi-order number stored in said first and second storing devices to said computer means and printing means, said first and second transfer control means having, respectively, denominational sets of first and second transfer control members for respectively connecting sets of storing members of said first and second storing devices with said sets of storing members of said computer storing device and being operatively connected to said printing means; a first control cam shaft shiftable in axial direction between two shifted positions and including a set of first cams respectively associated with different denominational orders; two sets of first cam followers operatively connected to said first input control members and to said first transfer control members, respectively, said sets of cam followers respectively cooperating with said first cams in said shifted positions of said first control cam shaft; means for shifting said first control cam shaft in opposite directions so that each of said cams consecutively actuates said first input control members in a selected sequence of denominational orders during rotation of said first control cam shaft in one shifted position and in one direction of rotation and so that each of said cams consecutively actuates said first transfer control members in a reversed sequence of denominational orders during rotation in the opposite direction in the other shifted position of said first control cam shaft; a second control cam shaft including a set of second cams associated with different denominational orders; a set of second cam followers respectively cooperating with said second cams and being operatively connected to said second input control members so that during rotation of said second control cam shaft in said one direction said second input control members are actuated in said selected sequence of denominational orders; first drive means for simultaneously rotating in consecutive steps said first and second control cam shafts in said one direction; second drive means for rotating said first control cam shaft in consecutive steps in said opposite direction; operating means for actuating said second drive means after all orders of a multi-order number have been stored in said first and second storing devices so that the multi-order number is transferred to said computer means before said first control shaft has completed one revolution; a third control cam shaft including a set of third cams respectively associated with different denominational orders; a set of third cam followers respectively cooperating with said third cams and being operatively connected to said transfer control members to consecutively actuate the same during rotation of said second control cam shaft in said one driection; third drive means for rotating said third control cam shaft when said second cam shaft has performed one revolution so that printing starts before said first control cam shaft has completed one revolution in said opposite direction; third input control means associated with said computer storing device and having a denominational set of third input control members; a fourth control cam shaft including a set of fourth cams respectively associated with denominational orders; a set of fourth cam followers cooperating with said fourth cams and being respectively operatively connected to said third input control members so that each of said fourth cams actuates during rotation of said third control cam shaft in said opposite direction said third input control members in said reversed sequence of denominational orders; fourth drive means for driving said fourth cam shaft, said operating means simultaneously actuating said second and fourth drive means; a carriage movable in a stepwise movement; spacing means for moving said carriage in steps; and means for actuating said spacing means connected to and controlled by second control shaft in such a manner that said spacing means moves said carriage the same number of steps as second control cam shaft performs to complete one revolution after storing all orders of the multi-order number and after said operating means has actuated said second and third drive means.

6. A business machine as claimed in claim 5 and including circuit means connecting said storing devices with said computer means and said printing means; wherein said storing devices, said computer means and said printing means are electrically operated; and switch means in said circuit for selectively connecting said first and second storing devices with said computer means and said printing means so that said first and second storing devices can be selectively substituted for each other.

7. A business machine as claimed in claim 5 and including a step-counting cam shaft having a set of cams respectively associated with different denominational orders the number of said cams of said step-counting cam shaft being the same as the number of cams of said second control cam shaft; a set of contacts respectively associated with said cams of said step-counting cam shaft, said step-counting cam shaft rotating simultaneously with said second control cam shaft; said means for actuating said spacing means being connected to and controlled by said step-counting cam shaft in such manner that said spacing means moves said carriage the same number of steps as said step-counting cam shaft performs to complete one revolution after said operating means has actuated said second and third drive means.

References Cited in the file of this patent

UNITED STATES PATENTS

| | | |
|---|---|---|
| 1,876,296 | Hofgaard | Sept. 6, 1932 |
| 2,084,445 | Kottmann | June 27, 1937 |
| 2,405,287 | Brand | Aug. 6, 1946 |
| 2,573,581 | Lake | Oct. 30, 1951 |
| 2,645,423 | Pfleger | July 14, 1953 |

FOREIGN PATENTS

| | | |
|---|---|---|
| 1,080,026 | France | May 26, 1954 |